Patented July 19, 1932

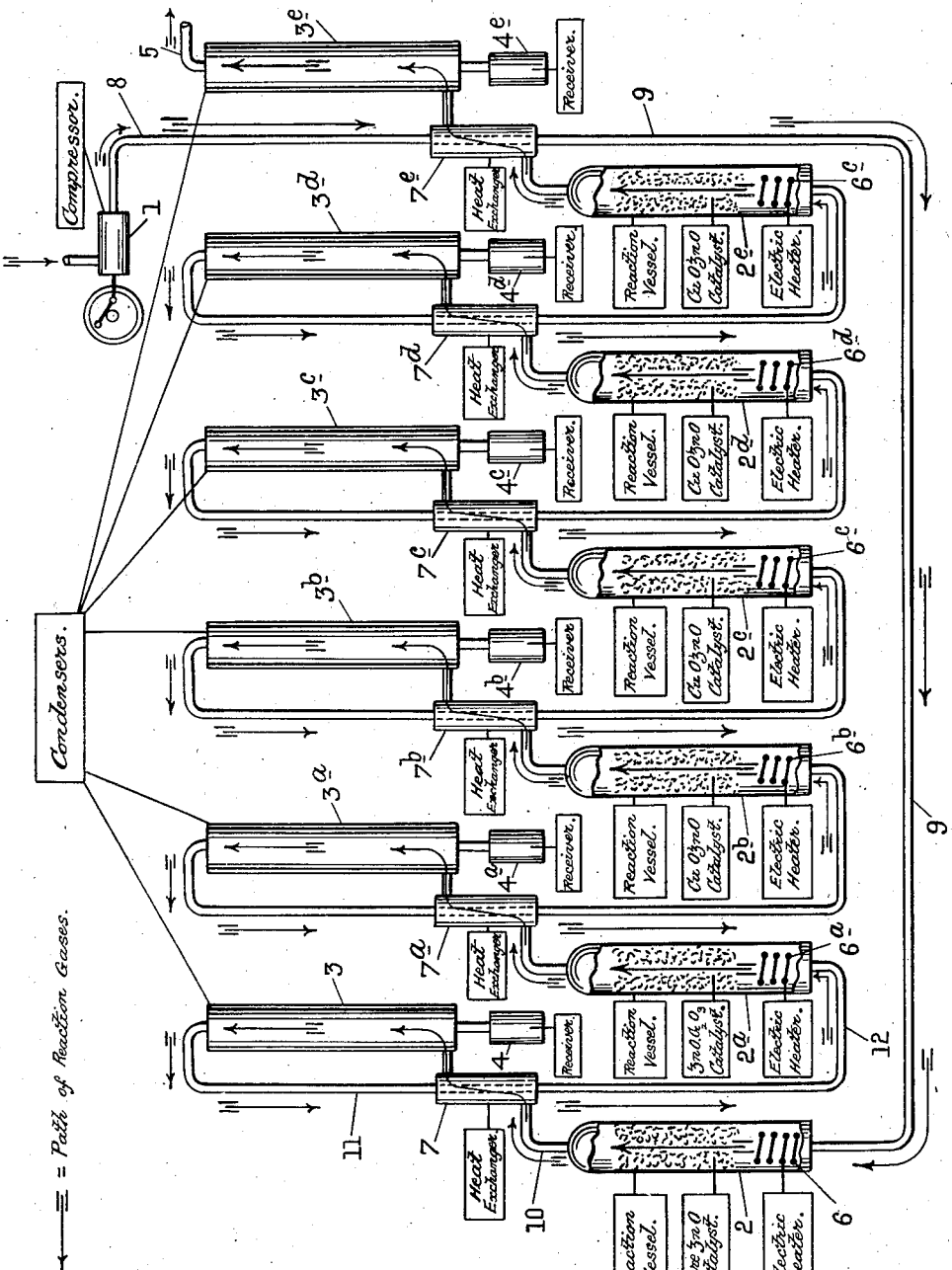

1,868,096

UNITED STATES PATENT OFFICE

HENRY DREYFUS, OF LONDON, ENGLAND

MANUFACTURE OF METHYL ALCOHOL

Application filed May 27, 1930, Serial No. 455,989, and in Great Britain June 5, 1929.

This invention relates to the synthesis of methanol by the subjection of mixtures of carbon monoxide and hydrogen to the action of catalysts under elevated temperatures and pressure.

Numerous substances, particularly catalysts comprising copper, manganese or their compounds, are very active in promoting the synthesis of methanol, but their use on an industrial scale has been difficult or impossible owing to their sensitivity to sulphur poisoning. For this reason the industrial manufacture of methanol is usually performed in presence of zinc oxide or zinc oxide and chromium oxide.

The present invention provides a process whereby the catalysts sensitive to sulphur poisoning, and particularly catalysts comprising copper or manganese (or compounds of copper or manganese) can be successfully applied to the industrial manufacture of methanol.

According to the invention methanol is prepared by passing the reaction gases under the requisite conditions of temperature and pressure for the formation of methanol first over one or more catalyst masses composed of zinc oxide or zinc oxide and chromium oxide and thereafter over one or more methanol catalysts sensitive to sulphur poisoning, and particularly catalysts comprising copper, manganese or compounds of copper or manganese.

In performing the reaction the reaction gases are passed successively through a number of reaction vessels arranged in series as an open system (i. e. not as a closed circuit). By these means a substantially complete conversion of the reaction gases or vapors may be readily effected.

The process of the invention may be performed under pressures and temperatures usually or hitherto employed for the particular synthesis envisaged and the catalyst or catalysts employed, and such temperatures and pressures may be similar or dissimilar as between reaction vessels in the system.

In their passage from one reaction vessel to the next, the reaction vapours are treated to remove products of the conversion, as for instance by condensation.

The following example serves to illustrate one convenient method of preparing methanol in accordance with the invention:—

Example

A stream of water gas (or other industrial gas) containing between about 50 and 65% CO and 30 and 45% hydrogen is passed under a pressure of between 50 and 150 atmospheres through a chain of reaction vessels arranged in series. In the first reaction vessel or vessels of the series is placed a catalyst composed of pure zinc oxide. In the remaining reaction vessels of the series is placed a methanol catalyst containing copper or manganese, e. g. a mixture of copper oxide and zinc oxide. The temperature of the reaction in the reaction vessels is maintained at that commonly employed with the particular catalyst, usually such temperatures are between 200° and 540° C. and particularly between 300° and 450° C. Between each pair of reaction vessels the reaction gases are treated to remove methanol as far as possible for instance by cooling and/or scrubbing with water, after which treatment the gases may, if necessary, be again raised to the reaction temperature by any suitable means before passing on to the next reaction vessel of the series. If desired, a sufficiently large number of reaction vessels may be employed in the series to ensure that substantially all the gas undergoes conversion; four or five reaction vessels are usually suitable for this purpose.

The accompanying diagrammatic drawing serves to illustrate such form of execution of the invention.

Referring to the drawing, 1 is a compressor which supplies the water gas under the requisite pressure (e. g. 100–150 atmospheres). 2, 2a, 2b, 2c, 2d and 2e are the reaction vessels, the reaction vessels 2 and 2a being provided respectively with a catalyst composed of pure zinc oxide and a catalyst composed of zinc oxide and chromium oxide. The reaction vessels 2b, 2c, 2d and 2e are each charged with a catalyst composed of copper oxide and zinc oxide, which catalyst is sensitive to sulphur poisoning. The reaction vessels are connected as an open chain in series in the manner shown. Between each pair of reaction vessels a condenser (3, 3a, 3b, 3c and 3d) is provided to separate the methanol produced, each condenser being provided with a receiver (4, 4a, 4b, 4c and 4d). Between the final reaction vessel 2e and the exhaust 5 a condenser 3e is provided to separate methanol produced in the reaction vessel 2e, the condenser 3e being provided with a receiver 4e. Each of the reaction vessels is provided with an electric heater 6, 6a, 6b, 6c, 6d and 6e, these heaters enabling the reaction temperature in the vessels 2, 2a, 2b etc. to be attained or controlled. Between the reaction vessels 2 and 2a there is provided a heat exchanger 7 which heats the gases passing from the condenser 3 to the vessel 2a by means of the hot reaction gases leaving the reaction vessel 2. Similar heat exchangers 7a, 7b, 7c and 7d are arranged between each of the other pairs of reaction vessels. Between the reaction vessel 2e and condenser 3e is provided a similar heat exchanger 7e which heats the gases passing from the compressor 1 to the reaction vessel 2 by means of the hot gases passing from the reaction vessel 2e to the condenser 3e.

Assuming that the apparatus is being started up. The water gas passes under the desired pressure (say 100–150 atmospheres) from the compressor 1 via the pipe 8 to the heat exchanger 7e and from thence via the pipe 9 to the reaction vessel 2 (i. e. the first reaction vessel in the series). On entering this reaction vessel 2 the gases are raised to a temperature to initiate the reaction (e. g. 250–350° C.) by means of the electric heater 6. After passing from the heater 6 the gases pass through the zinc oxide catalyst and leave the reaction vessel 2 by the pipe 10. In their passage through the catalyst the gases, of course, get hotter through the exothermic reaction to methanol and they leave the vessel 2 at a considerable higher temperature (e. g. 350–400° C.) than that obtaining in the region of the heater 6. From the pipe 10 the heated reaction gases pass via a heat exchanger 7 to the condenser 3 wherein the methanol produced in the reaction vessel 2 is condensed and passes to the receiver 4. From the condenser 3 the uncondensed gases pass via the pipe 11 to the heat exchanger 7 wherein they are heated by heat exchange with the heated gases passing from the pipe 10 to the condenser 3. From the heat exchanger 7 the gases so heated pass by the pipe 12 to the reaction vessel 2a (the second reaction vessel in the series). Such heat as may be necessary to bring the gases again to the reaction temperature for initiating the reaction to methanol is supplied by the electric heater 6a. The gases pass on from the vessel 2a, via the heat exchanger 7a, condenser 3a and heat exchanger 7a to the next reaction vessel (reaction vessel 2b) in the series in manner similar to that in which they pass from the vessel 2 to 2a. After leaving the condenser 3a substantially no sulphur compounds remain in the gases, thereby avoiding difficulty of poisoning the sensitive catalyst (copper, zinc and zinc oxide) contained in the remaining reaction vessels of the series. The gases pass from the reaction vessel 2b successively to and through the vessels 2c, 2d and 2e in a manner similar to their passage through the vessels 2a and 2b. After leaving the vessel 2e they pass via the heat exchanger 7e to the condenser 3e and exhaust 5. By passing through the heat exchanger 7e the hot gases leaving the reaction vessel 2e heat up the gases passing via the pipes 8 and 9 to the vessel 2, the first reaction vessel of the series, thereby enabling the heater 6 to be used simply as a booster heater or for control purposes once the apparatus is in full operation.

What I claim and desire to secure by Letters Patent is:—

1. Process for the manufacture of methanol by subjecting a mixture of carbon monoxide and hydrogen to elevated temperatures and pressure in presence of catalysts, which comprises passing the reaction gases under the requisite temperature and pressure successively over at least one catalyst mass selected from the group consisting of zinc oxide and zinc oxide plus chromium oxide, and thereafter over at least one methanol catalyst sensitive to sulphur poisoning.

2. Process for the manufacture of methanol by subjecting a mixture of carbon monoxide and hydrogen to elevated temperatures and pressure in presence of catalysts, which comprises passing the reaction gases under the requisite temperature and pressure successively over at least one catalyst mass selected from the group consisting of zinc oxide and zinc oxide plus chromium oxide, and thereafter over at least one methanol catalyst comprising copper oxide.

3. Process for the manufacture of methanol by subjecting a mixture of carbon monoxide and hydrogen to elevated temperatures and pressure in presence of catalysts, which comprises passing the reaction gases under the requisite temperature and pressure successively over at least one catalyst mass composed of zinc oxide and chromium oxide, and thereafter over at least one catalyst mass composed of zinc oxide and copper oxide.

4. Process for the manufacture of methanol by subjecting a mixture of carbon monoxide and hydrogen to elevated temperatures and pressure, and wherein the reaction gases are caused to pass under the requisite temperature and pressure successively through a series of reaction vessels charged with catalyst masses and arranged as an open chain, characterized in that the gases are caused to pass through at least one reaction vessel charged with a catalyst mass selected from the group consisting of zinc oxide and zinc oxide plus chromium oxide, and thereafter through at least one reaction vessel charged with a methanol catalyst sensitive to sulphur poisoning.

5. Process for the manufacture of methanol by subjecting a mixture of carbon monoxide and hydrogen to elevated temperatures and pressure, and wherein the reaction gases are caused to pass under the requisite temperature and pressure successively through a series of reaction vessels charged with catalyst masses and arranged as an open chain, characterized in that the gases are caused to pass through at least one reaction vessel charged with a catalyst mass selected from the group consisting of zinc oxide and zinc oxide plus chromium oxide, and thereafter through at least one reaction vessel charged with a methanol catalyst comprising copper oxide.

6. Process for the manufacture of methanol by subjecting a mixture of carbon monoxide and hydrogen to elevated temperatures and pressure, and wherein the reaction gases are caused to pass under the requisite temperature and pressure successively through a series of reaction vessels charged with catalyst masses and arranged as an open chain, characterized in that the gases are caused to pass through at least one reaction vessel charged with a catalyst mass composed of zinc oxide and chromium oxide, and thereafter through at least one reaction vessel charged with a catalyst mass composed of zinc oxide and copper oxide.

7. In a process according to claim 4 the step of condensing the methanol from the reaction gases in their passage between the catalyst masses of the series.

8. Process according to claim 6 and wherein the reaction gases are passed through a number of reaction vessels, which number is sufficiently large to ensure that substantially all the gases undergo conversion to methanol.

In testimony whereof, I have hereunto subscribed my name.

HENRY DREYFUS.